US012662082B2

(12) United States Patent　　　(10) Patent No.:　US 12,662,082 B2
Tomida et al.　　　　　　　　　　 (45) Date of Patent:　Jun. 23, 2026

(54) VEHICLE MANAGEMENT APPARATUS, VEHICLE, VEHICLE MANAGEMENT METHOD, AND NON-TRANSITORY COMPUTER READABLE MEDIUM

(71) Applicant: TOYOTA JIDOSHA KABUSHIKI KAISHA, Toyota (JP)

(72) Inventors: Hiroto Tomida, Tokyo-to (JP); Ryosuke Kobayashi, Nagakute (JP); Satoshi Komamine, Nagoya (JP); Tetsuya Ide, Chofu (JP); Mayuko Abe, Shinagawa-ku (JP); Makoto Akahane, Yokohama (JP); Haruki Oguri, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 272 days.

(21) Appl. No.: 18/471,290

(22) Filed: Sep. 21, 2023

(65) Prior Publication Data

US 2024/0109512 A1　Apr. 4, 2024

(30) Foreign Application Priority Data

Sep. 30, 2022　(JP) ................................. 2022-158934

(51) Int. Cl.
B60R 25/04 (2013.01)
B60R 25/24 (2013.01)
B60R 25/31 (2013.01)
G07C 9/00 (2020.01)

(52) U.S. Cl.
CPC .............. *B60R 25/04* (2013.01); *B60R 25/24* (2013.01); *B60R 25/31* (2013.01); *G07C*

*9/00309* (2013.01); *G07C 2009/00769* (2013.01); *G07C 2209/08* (2013.01); *G07C 2209/63* (2013.01)

(58) Field of Classification Search
CPC ......... B60R 25/24; B60R 25/04; B60R 25/31; G06Q 10/08; G07C 9/00309; G07C 9/00896; G07C 2209/08; G07C 2009/00769; G07C 2209/63
See application file for complete search history.

(56) References Cited

U.S. PATENT DOCUMENTS

| | | | |
|---|---|---|---|
| 10,906,509 B1 * | 2/2021 | Turk | .................... G07C 5/0866 |
| 11,400,888 B1 | 8/2022 | Weinerman et al. | |
| 2016/0264097 A1 * | 9/2016 | Oesterling | .............. B60R 25/20 |
| 2016/0316322 A1 * | 10/2016 | Gillen | ................... H04W 4/029 |
| 2017/0101110 A1 * | 4/2017 | Yoo | ........................ B60W 10/20 |
| 2017/0364926 A1 * | 12/2017 | Crawford | ........... G01G 23/3735 |

FOREIGN PATENT DOCUMENTS

| | | |
|---|---|---|
| CN | 106741424 A | 5/2017 |
| JP | 2003002169 A | 1/2003 |

* cited by examiner

*Primary Examiner* — Yong Hang Jiang
(74) *Attorney, Agent, or Firm* — KENJA IP LAW PC

(57) ABSTRACT

A vehicle management apparatus is configured to manage a vehicle for delivery loaded with one or more packages. The vehicle management apparatus includes a controller configured to, upon detecting that the vehicle has stopped, determine, based on vehicle data indicating a status of the vehicle, whether a driver of the vehicle is making a delivery, and control a door of the vehicle to lock in a case in which it has been determined that the driver is making a delivery.

13 Claims, 4 Drawing Sheets

FIG. 2

VEHICLE MANAGEMENT APPARATUS, VEHICLE, VEHICLE MANAGEMENT METHOD, AND NON-TRANSITORY COMPUTER READABLE MEDIUM

CROSS-REFERENCE TO RELATED APPLICATION

This application claims priority to Japanese Patent Application No. 2022-158934 filed on Sep. 30, 2022, the entire contents of which are incorporated herein by reference.

TECHNICAL FIELD

The present disclosure relates to a vehicle management apparatus, a vehicle, a vehicle management method, and a non-transitory computer readable medium.

BACKGROUND

Patent Literature (PTL) 1 discloses theft prevention technology for a vehicle having lockable seat doors and a lockable baggage room door, in which, when a predetermined period of time elapses after a security function is deactivated, the security function is reactivated.

CITATION LIST

Patent Literature

PTL 1: JP 2003-002169 A

SUMMARY

Drivers of delivery vehicles may leave the vehicles for purposes other than package delivery, e.g., for the purpose of loading and unloading packages at warehouses of logistics providers or for the purpose of taking a rest. In the technology described in PTL 1, the security function is always activated and the doors are locked even in a case in which a driver of a delivery vehicle leaves the delivery vehicle for a purpose other than package delivery. Accordingly, the driver has to deactivate the security function to unlock the doors every time the driver leaves the vehicle. Therefore, there is room for improvement in terms of convenience.

It would be helpful to improve anti-theft technology in convenience.

A vehicle management apparatus according to the present disclosure is a vehicle management apparatus configured to manage a vehicle for delivery loaded with one or more packages, the vehicle management apparatus including a controller configured to:

upon detecting that the vehicle has stopped, determine, based on vehicle data indicating a status of the vehicle, whether a driver of the vehicle is making a delivery; and control a door of the vehicle to lock in a case in which it has been determined that the driver is making a delivery.

A vehicle management method according to the present disclosure is a vehicle management method for managing a vehicle for delivery loaded with one or more packages, the vehicle management method including:

upon detecting that the vehicle has stopped, determining, by a controller based on vehicle data indicating a status of the vehicle, whether a driver of the vehicle is making a delivery; and controlling, by the controller, a door of the vehicle to lock in a case in which it has been determined that the driver is making a delivery.

A non-transitory computer readable medium according to the present disclosure stores a program configured to cause a computer, as a vehicle management apparatus configured to manage a vehicle for delivery loaded with one or more packages, to execute operations, the operations including:

upon detecting that the vehicle has stopped, determining, based on vehicle data indicating a status of the vehicle, whether a driver of the vehicle is making a delivery; and controlling a door of the vehicle to lock in a case in which it has been determined that the driver is making a delivery.

According to the present disclosure, anti-theft technology is improved in convenience.

BRIEF DESCRIPTION OF THE DRAWINGS

In the accompanying drawings:

FIG. 2 is a block diagram illustrating a configuration of a vehicle management apparatus according to the embodiment of the present disclosure;

DETAILED DESCRIPTION

Figure 1:
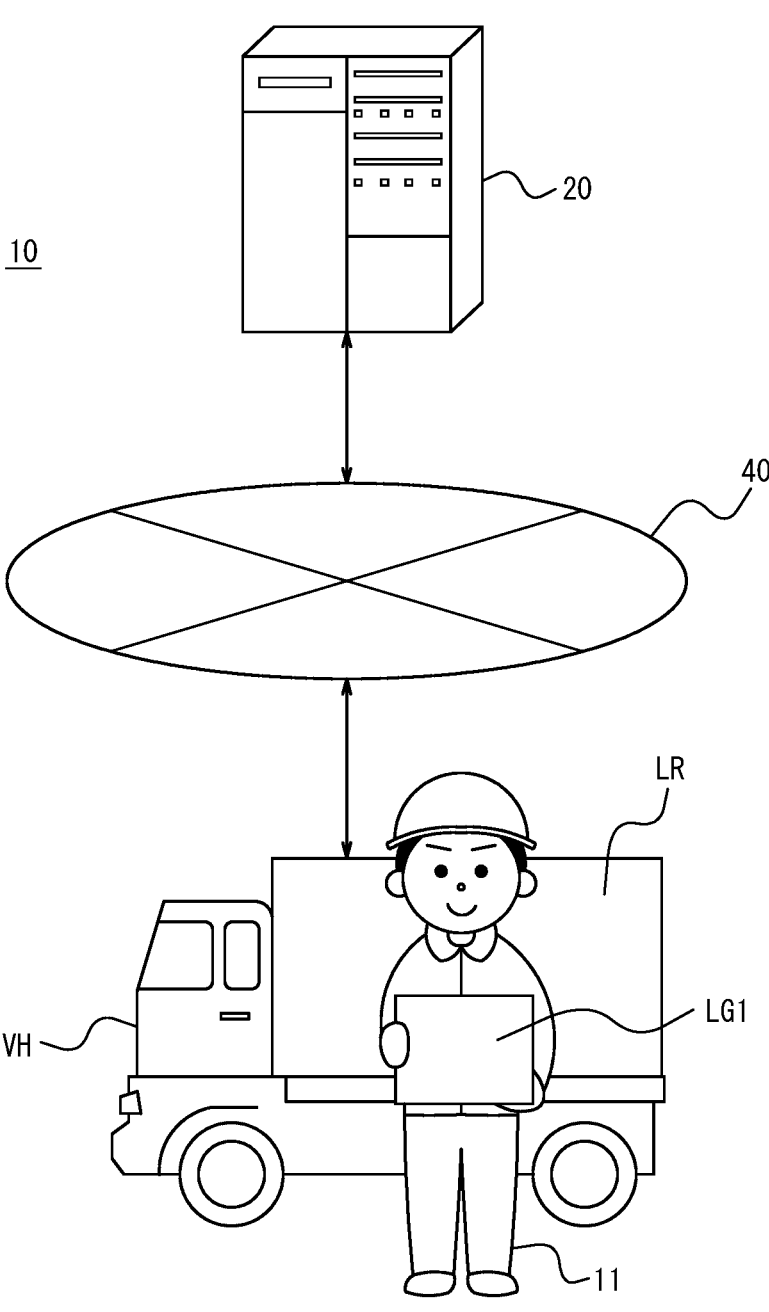
FIG. 1 is a diagram illustrating a configuration of a system according to an embodiment of the present disclosure.

An embodiment of the present disclosure will be described below, with reference to the drawings.

In the drawings, the same or corresponding portions are denoted by the same reference numerals. In the description of the present embodiment, detailed description of the same or corresponding portions is omitted or simplified, as appropriate.

A configuration of a system 10 according to the present embodiment will be described with reference to FIG. 1.

The system 10 according to the present embodiment includes at least one vehicle management apparatus 20 and at least one vehicle VH. The vehicle management apparatus 20 can communicate with the vehicle VH via a network 40 such as the Internet.

The vehicle management apparatus 20 is installed in a facility such as a data center and operated by an operator managing the vehicle VH. The operator is, for example, a delivery service provider that receives goods, such as packages, from customers and delivers the goods to designated destinations. The vehicle management apparatus 20 is, for example, a computer such as a server that belongs to a cloud computing system or other computing system. The vehicle management apparatus 20 may be installed in a control room of the system 10 and used by the operator. Alternatively, the vehicle management apparatus 20 installed in the control room may be shared by two or more operators.

The vehicle VH is, for example, any type of automobile such as a gasoline vehicle, a diesel vehicle, a hydrogen vehicle, an HEV, a PHEV, a BEV, or an FCEV. The term "HEV" is an abbreviation of hybrid electric vehicle. The term "PHEV" is an abbreviation of plug-in hybrid electric vehicle. The term "BEV" is an abbreviation of battery electric vehicle. The term "FCEV" is an abbreviation of fuel cell electric vehicle. In the present embodiment, the vehicle VH is driven by a driver 11, but the driving may be automated at any level. The automation level is, for example, any one of Level 1 to Level 5 according to the level classification defined by SAE. The name "SAE" is an abbreviation of Society of Automotive Engineers.

The network 40 includes the Internet, at least one WAN, at least one MAN, or a combination thereof. The term "WAN" is an abbreviation of wide area network. The term "MAN" is an abbreviation of metropolitan area network. The network 40 may include at least one wireless network, at least one optical network, or a combination thereof. The wireless network is, for example, an ad hoc network, a cellular network, a wireless LAN, a satellite communication network, or a terrestrial microwave network. The term "LAN" is an abbreviation of local area network.

An outline of the present embodiment will be described with reference to FIG. 1.

In the present embodiment, for example, packages LG are brought by senders to sales offices of a delivery service provider, which is an administrator of the system 10, and are accepted by the sales offices. The sales offices include, for example, agencies that receive the packages LG from the senders and pass the packages LG on to the delivery service provider. The vehicle VH is a delivery vehicle that is loaded with the accepted one or more packages LG for delivery. The vehicle VH is loaded with the packages LG for delivery, for example, in a cargo compartment LR. Alternatively, the vehicle VH may be loaded with the packages LG for delivery in a cabin. The vehicle VH is equipped with a weight sensor WS that detects the weight of the vehicle VH. The vehicle VH transports the one or more packages LG to delivery points DP for the respective packages LG. In the present embodiment, the delivery points DP are places at which the packages LG are handed over from the vehicle VH to addressees of the respective packages LG. Specifically, the delivery points DP are homes of the addressees of the respective packages LG. In the present embodiment, a plurality of the packages LG may be handed over together at one delivery point DP. Upon arriving at a delivery point DP1 for a package LG1 in the one or more packages LG, a driver 11 stops the vehicle VH and opens a door of the cargo compartment LR to take out the package LG1 and deliver the package LG1 to an addressee of the package LG1. In the present embodiment, the vehicle VH may be equipped with a door sensor CS that detects the opening/closing of the door of the vehicle VH.

In the system 10 illustrated in FIG. 1, upon detecting that the vehicle VH has stopped, the vehicle management apparatus 20, which manages the vehicle VH, determines, based on vehicle data VD indicating a status of the vehicle VH, whether the driver 11 of the vehicle VH is making a delivery. The vehicle management apparatus 20 controls the door of the vehicle VH to lock in a case in which it has been determined that the the driver 11 is making a delivery.

According to the present embodiment, the door of the vehicle VH is locked in a case in which the driver 11 is making a delivery. In other words, in a case in which the driver 11 is not making a delivery, i.e., in a case in which the driver 11 is leaving the vehicle VH for purposes other than package delivery, e.g., for the purpose of loading and unloading packages at a warehouse of a logistic provider or for the purpose of taking a rest, the door of the vehicle VH would not be locked. Thus, the driver 11 need not unlock the door of the vehicle VH every time the driver 11 leaves the vehicle VH. Accordingly, anti-theft technology is improved in convenience.

Figure 2:
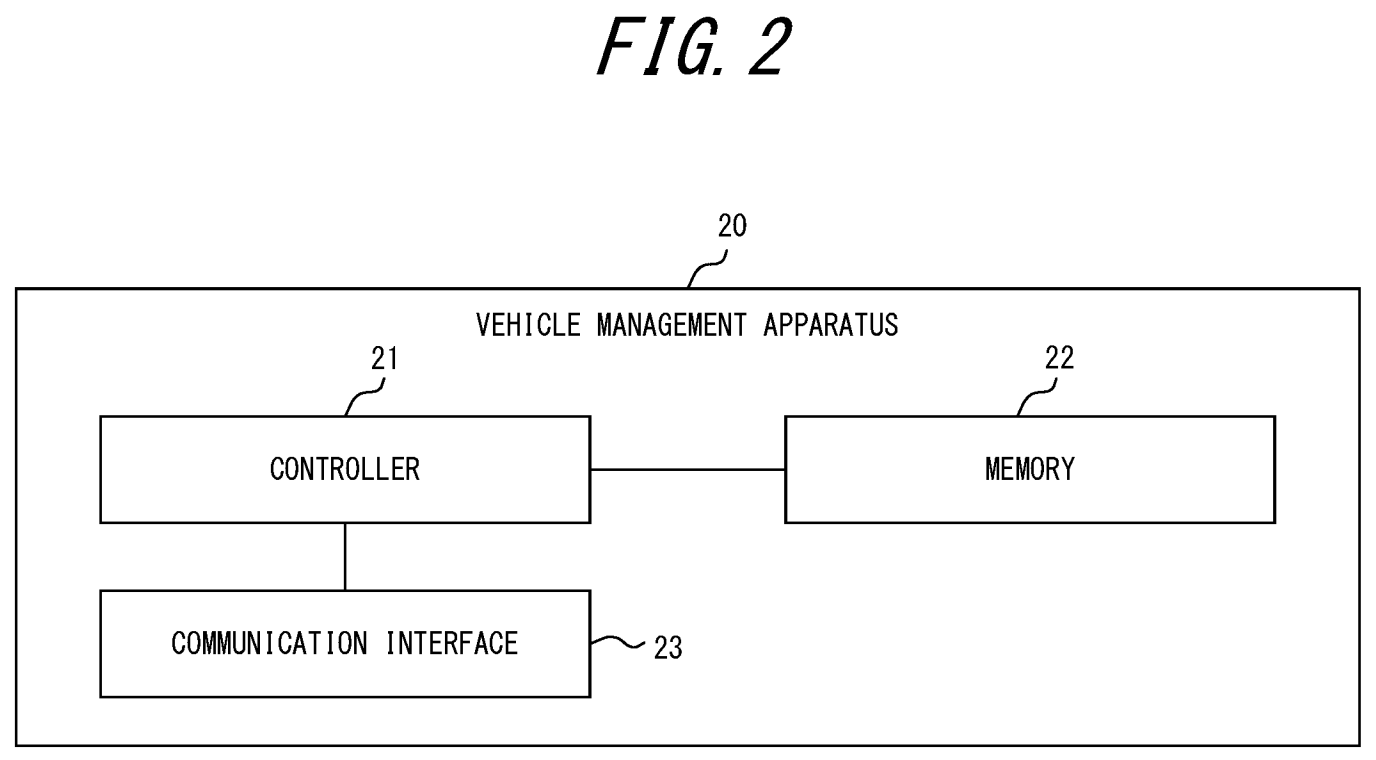

A configuration of the vehicle management apparatus 20 according to the present embodiment will be described with reference to FIG. 2.

The vehicle management apparatus 20 includes a controller 21, a memory 22, and a communication interface 23.

The controller 21 includes at least one processor, at least one programmable circuit, at least one dedicated circuit, or any combination thereof. The processor is a general purpose processor such as a CPU or a GPU, or a dedicated processor that is dedicated to specific processing. The term "CPU" is an abbreviation of central processing unit. The term "GPU" is an abbreviation of graphics processing unit. The programmable circuit is, for example, an FPGA. The term "FPGA" is an abbreviation of field-programmable gate array. The dedicated circuit is, for example, an ASIC. The term "ASIC" is an abbreviation of application specific integrated circuit. The controller 21 executes processes related to operations of the vehicle management apparatus 20 while controlling components of the vehicle management apparatus 20.

The memory 22 includes at least one semiconductor memory, at least one magnetic memory, at least one optical memory, or any combination thereof. The semiconductor memory is, for example, RAM or ROM. The term "RAM" is an abbreviation of random access memory. The term "ROM" is an abbreviation of read only memory. The RAM is, for example, SRAM or DRAM. The term "SRAM" is an abbreviation of static random access memory. The term "DRAM" is an abbreviation of dynamic random access memory. The ROM is, for example, EEPROM. The term "EEPROM" is an abbreviation of electrically erasable programmable read only memory. The memory 22 functions as, for example, a main memory, an auxiliary memory, or a cache memory. The memory 22 stores data to be used for the operations of the vehicle management apparatus 20 and data obtained by the operations of the vehicle management apparatus 20. In the present embodiment, vehicle data VD may be stored in the memory 22.

The communication interface 23 includes at least one interface for communication. The interface for communication is, for example, a LAN interface. The communication interface 23 receives data to be used for the operations of the vehicle management apparatus 20, and transmits data obtained by the operations of the vehicle management apparatus 20. In the present embodiment, the communication interface 23 communicates with the vehicle VH. For example, the controller 21 may receive vehicle data VD from the vehicle VH via the communication interface 23.

The functions of the vehicle management apparatus 20 are realized by execution of a program according to the present embodiment by a processor serving as the controller 21. That is, the functions of the vehicle management apparatus 20 are realized by software. The program causes a computer to execute the operations of the vehicle management apparatus 20, thereby causing the computer to function as the vehicle management apparatus 20. That is, the computer executes the operations of the vehicle management apparatus 20 in accordance with the program to thereby function as the vehicle management apparatus 20.

The program may be stored in a non-transitory computer readable medium. The non-transitory computer readable medium is, for example, flash memory, a magnetic recording device, an optical disc, a magneto-optical recording medium, or ROM. The program is distributed, for example, by selling, transferring, or lending a portable medium such as an SD card, a DVD, or a CD-ROM on which the program is stored. The term "SD" is an abbreviation of Secure Digital. The term "DVD" is an abbreviation of digital versatile disc. The term "CD-ROM" is an abbreviation of compact disc read only memory. The program may be distributed by storing the program in a storage of a server and transferring the program from the server to another computer. The program may be provided as a program product.

For example, the computer temporarily stores, in a main memory, a program stored in a portable medium or a program transferred from a server. Then, the computer reads the program stored in the main memory using a processor, and executes processes in accordance with the read program using the processor. The computer may read a program directly from the portable medium, and execute processes in accordance with the program. The computer may, each time a program is transferred from the server to the computer, sequentially execute processes in accordance with the received program. Instead of transferring a program from the server to the computer, processes may be executed by a so-called ASP type service that realizes functions only by execution instructions and result acquisitions. The term "ASP" is an abbreviation of application service provider. Programs encompass information that is to be used for processing by an electronic computer and is thus equivalent to a program. For example, data that is not a direct command to a computer but has a property that regulates processing of the computer is "equivalent to a program" in this context.

Some or all of the functions of the vehicle management apparatus 20 may be realized by a programmable circuit or a dedicated circuit serving as the controller 21. That is, some or all of the functions of the vehicle management apparatus 20 may be realized by hardware.

Operations of the vehicle management apparatus 20 according to the present embodiment will be described with reference to FIGS. 3 and 4. These operations correspond to a vehicle management method according to the present embodiment.

Figure 3:
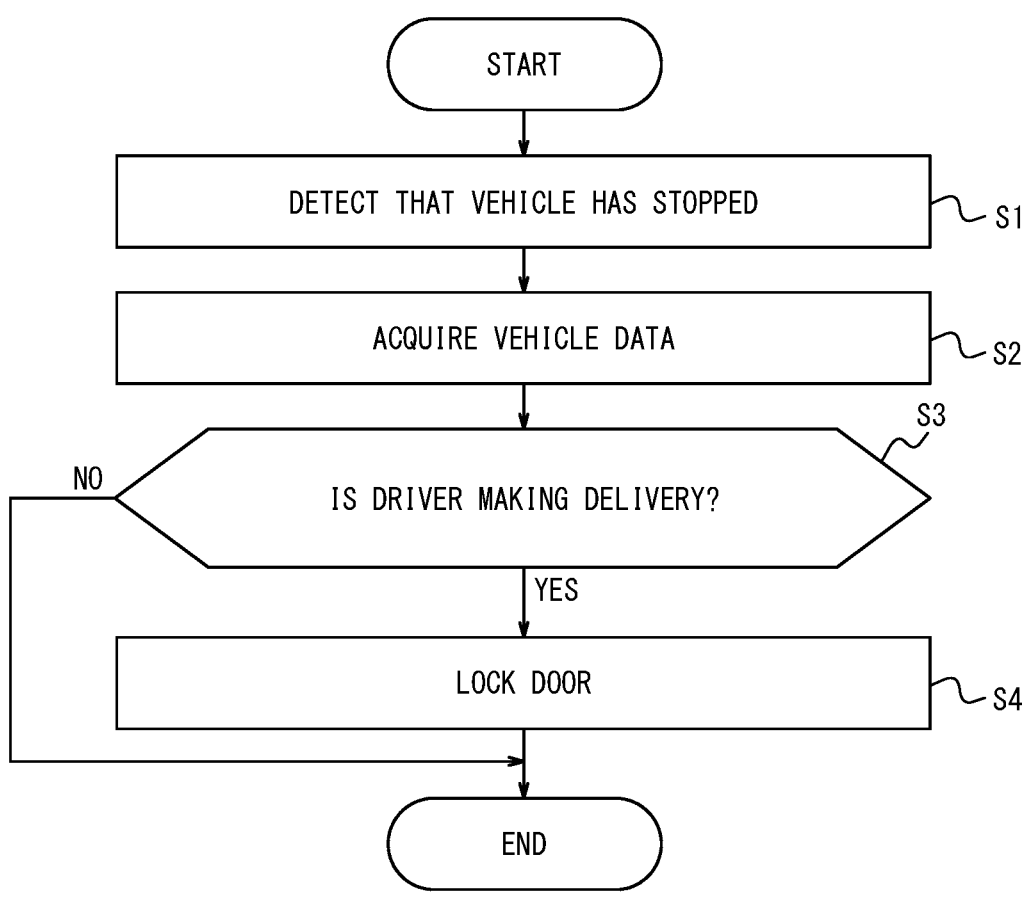
FIG. 3 is a flowchart illustrating operations of the vehicle management apparatus according to the embodiment of the present disclosure.

In step S1 of FIG. 3, the controller 21 of the vehicle management apparatus 20 detects that the vehicle VH has stopped. Whether the vehicle VH has stopped may be detected by any procedure. In the present embodiment, the controller 21 detects, based on detection values from various sensors installed in the vehicle VH, that the vehicle VH has stopped. The various sensors include, for example, an accelerometer, gyro sensor, and the like.

In step S2 of FIG. 3, the controller 21 of the control apparatus 20 acquires vehicle data VD indicating a status of the vehicle VH. Specifically, the controller 21 acquires, as the vehicle data VD, weight data WD indicating the weight of the vehicle VH. As an example, the vehicle VH is a delivery vehicle that is loaded with packages LG for delivery in a cargo compartment LR, and the weight data WD is data indicating a weight W in the cargo compartment LR of the vehicle VH. The weight data WD includes at least first weight data WD1 and second weight data WD2. In the present embodiment, the first weight data WD1 is data indicating a weight W1 in the cargo compartment LR measured at a first time point T1 before the vehicle VH has stopped. The second weight data WD2 is data indicating a weight W2 in the cargo compartment LR measured at a second time point T2 after the vehicle VH has stopped. The weight data WD, which may be acquired by any procedure, is acquired by, for example, the following procedure in the pre sent embodiment.

In the present embodiment, the controller 21 of the vehicle management apparatus 20 acquires the weight data WD from a weight sensor WS installed in the vehicle VH. The weight sensor WS is, for example, any sensor such as a pressure-sensitive sensor provided on the floor of the cargo compartment LR of the vehicle VH. The weight sensor WS detects the weight W1 in the cargo compartment LR at the first time point T1 and the weight W2 in the cargo compart-ment LR at the second time point T2. The weight sensor WS transmits, to the vehicle management apparatus 20, the first weight data WD1 indicating the weight W1 that is a detec-tion result at the first time point T1 and the second weight data WD2 indicating the weight W2 that is a detection result at the second time point T2. The communication interface 23 of the vehicle management apparatus 20 receives the trans-mitted first weight data WD1 and second weight data WD2 from the weight sensor WS. The controller 21 acquires, as the weight data WD, the first weight data WD1 and second weight data WD2 received by the communication interface 23.

As another example in the present embodiment, the vehicle VH may be a delivery vehicle that is loaded with packages LG for delivery in a cabin. In such a case, the weight sensor WS is provided in the cabin. In step S2 of FIG. 3, the controller 21 of the vehicle management apparatus 20 may acquire, as the weight data WD, data indicating a weight in the cabin of the vehicle VH. However, the weight in the cabin should desirably not include the weight of a driver 11, so that the driver 11 getting in and out of the vehicle does not affect the first weight data WD1 and second weight data WD2.

In step S3 of FIG. 3, the controller 21 of the vehicle management apparatus 20 determines, based on the vehicle data VD acquired in step S2, whether the driver 11 of the vehicle VH is making a delivery. Specifically, the controller 21 determines, based on the first weight data WD1 and second weight data WD2 included in the weight data WD acquired as the vehicle data VD in step S2, whether the driver 11 of the vehicle VH is making a delivery. The controller 21 determines that the driver 11 is making a delivery in a case in which, as a result of comparison between the weight W1 indicated by the first weight data WD1 and the weight W2 indicated by the second weight data WD2, the weight W2 is less than the weight W1. This is because the weight of the vehicle VH is expected to decrease by the weight of a package LG1, in a case in which, for example, the driver 11 takes the package LG1 out of the vehicle VH for delivery. In other words, the weight in the cargo compartment LR or cabin is expected to decrease by the weight of the package LG1, in a case in which the driver 11 takes the package LG1 out of the cargo compartment LR or cabin for delivery.

As a variation of the present embodiment, the controller 21 of the vehicle management apparatus 20 may acquire door data DD, as the vehicle data VD, and determine, based on the acquired door data DD, whether the driver 11 of the vehicle VH is making a delivery. As an example, the vehicle VH is a delivery vehicle that is loaded with packages LG for delivery in a cargo compartment LR, and the door data DD is data indicating an open/close status of a door of the cargo compartment LR of the vehicle VH. In this variation, in step S2 of FIG. 3, the controller 21 of the vehicle management apparatus 20 acquires the door data DD, instead of or in addition to the weight data WD. The door data DD may be acquired by any procedure, but in this variation, for example, the following procedure is adopted.

In this variation, the controller 21 of the vehicle management apparatus 20 acquires the door data DD from a door sensor DS installed in the vehicle VH. Specifically, the controller 21 detects, based on a detection value from the door sensor DS installed in the door of the cargo compartment LR, that the door of the cargo compartment LR has been opened and closed. The door sensor DS is, for example, a contact sensor such as a microswitch or magnetic catch with switch, or a non-contact sensor such as an optical photo sensor or magnetic proximity sensor. The door sensor DS may be a door angle sensor that detects a pivot angle, which is an angle at which the door is pivoted from a closed position in a case in which the door is a swinging door. Alternatively, the door sensor DS may be a door distance sensor that detects a sliding distance, which is a distance that the door is slid from a closed position in a case in which the door is a sliding door. The door sensor DS monitors a status of the door after the vehicle VH has stopped, and transmits data indicating a detection value, as a detection result, to the vehicle management apparatus 20. The controller 21 of the vehicle management apparatus 20 receives the data transmitted from the door sensor DS via the communication interface 23 and acquires the received data as the door data DD.

As another example in this variation, the vehicle VH may be a delivery vehicle that is loaded with packages LG for delivery in a cabin. In such a case, the door sensor DS is provided in a door of the cabin. In step S2 of FIG. 3, the controller 21 of the vehicle management apparatus 20 may acquire, as the door data DD, data indicating the opening/closing of the door of the cabin of the vehicle VH.

In step S3 of FIG. 3, the controller 21 of the vehicle management apparatus 20 determines, based on the door data DD acquired in step S2, whether the door of the vehicle VH has been opened and closed. The controller 21 then determines that the driver 11 is making a delivery in a case in which it has been determined that the door had been opened and closed. This is because the door of the vehicle VH is expected to be opened and closed, for example, in a case in which the driver 11 takes the package LG1 out of the vehicle VH for delivery. In other words, the door of the cargo compartment LR or cabin is expected to be opened and closed, in a case in which the driver 11 takes the package LG1 out of the cargo compartment LR or cabin for delivery.

Alternatively, the controller 21 of the vehicle management apparatus 20 may determine that the door of the vehicle VH has been opened and closed, based on an image acquired from an image sensor installed in the vehicle VH, instead of or in addition to the detection value from the door sensor DS. The image sensor is any sensor, such as a camera capable of capturing images of the interior of the cargo compartment LR or cabin in which packages LG are loaded. The image sensor captures images of the interior of the cargo compartment LR or cabin and transmits the captured images to the vehicle management apparatus 20. The images may be still images or moving images. The images from the image sensor includes images of the door of the cargo compartment LR or images of the door of the cabin. In step S2 of FIG. 3, the controller 21 of the vehicle management apparatus 20 receives the images transmitted from the image sensor via the communication interface 23, to acquire the received images. In step S3 of FIG. 3, the controller 21 analyzes the acquired images to determine whether the door has been opened and closed. The controller 21 then determines that the driver 11 making a delivery in a case in which it has been determined that the door had been opened and closed.

As another variation of the present embodiment, the controller 21 of the vehicle management apparatus 20 may acquire, as the vehicle data VD, vehicle height data HD, and determine, based on the acquired vehicle height data HD, whether the driver 11 of the vehicle VH is making a delivery. The vehicle height data HD is data indicating a vehicle height H, which is the height of the vehicle VH from the ground. In this variation, in step S2 of FIG. 3, the controller 21 of the vehicle management apparatus 20 acquires the vehicle height data HD, instead of or in addition to the weight data WD or door data DD. The vehicle height data HD includes at least first vehicle height data HD1 and second vehicle height data HD2. The first vehicle height data HD1 is data indicating a vehicle height H1 of the vehicle VH measured at a first time point T1' before the vehicle VH has stopped. The second vehicle height data HD2 is data indicating a vehicle height H2 of the vehicle VH measured at a second time point T2' after the vehicle has stopped. The vehicle height data HD may be acquired by any procedure, but in the present embodiment, for example, the following procedure is adopted.

In this variation, the controller 21 of the vehicle management apparatus 20 acquires the vehicle height data HD from a vehicle height sensor HS installed in the vehicle VH. The vehicle height sensor HS is, for example, an arbitrary sensor that measures, as the vehicle height H, a quantity that substitutes as a height variation. As the quantity that substitutes as the height variation, for example, the amount of vertical displacement between a suspension arm and a vehicle body of the vehicle VH can be used. The vehicle height sensor HS detects the vehicle height H1 at the first time point T1' and the vehicle height H2 at the second time point T2'. The vehicle height sensor HS transmits, to the vehicle management apparatus 20, the first vehicle height data HD1 indicating the vehicle height H1 that is a detection result at the first time point T1' and the second vehicle height data HD2 indicating the vehicle height H2 that is a detection result at the second time point T2'. The controller 21 of the vehicle management apparatus 20 receives the first vehicle height data HD1 and second vehicle height data HD2 transmitted from the vehicle height sensor HS via the communication interface 23, to acquire the received first vehicle height data HD1 and second vehicle height data HD2 as the vehicle height data HD.

In step S3 of FIG. 3, the controller 21 of the vehicle management apparatus 20 determines, based on the vehicle height data HD acquired in step S2, whether the driver 11 of the vehicle VH is making a delivery. Specifically, the controller 21 determines, based on the first vehicle height data HD1 and second vehicle height data HD2 included in the vehicle height data HD acquired in step S2, whether the driver 11 of the vehicle VH is making a delivery. The controller 21 determines that the driver 11 is making a delivery in a case in which, as a result of comparison between the vehicle height H1 indicated by the first vehicle height data HD1 and the vehicle height H2 indicated by the second vehicle height data HD2, the vehicle height H2 is greater than the vehicle height H1. This is because the vehicle height H is expected to increase due to reduction in the weight of the vehicle VH by the weight of the package LG1, when the driver 11 takes the package LG1 out of the vehicle VH for delivery.

In a case in which it has been determined in step S3 of FIG. 3 that the driver 11 is making a delivery, the process of step S4 is performed. On the other hand, in a case in which it has been determined in step S3 that the driver 11 is not making a delivery, the process of FIG. 3 ends.

In step S4 of FIG. 3, the controller 21 of the vehicle management apparatus 20 controls a door of the vehicle VH to lock. As an example, in a case in which packages LG are loaded in the cargo compartment LR, the controller 21 controls, as the door of the vehicle VH, the door of the cargo compartment LR to lock. In such a case, the controller 21 may further control a door of a driver's seat of the vehicle VH to lock, in addition to controlling the door of the cargo compartment LR to lock. As another example of the present embodiment, in a case in which packages LG are loaded in the cabin, the controller 21 may control, as the door of the vehicle VH, the door of the cabin to lock. Any method may be used to control the door of the vehicle VH to lock. For example, the controller 21 controls a lock motor provided in the door of the vehicle VH to activate. In the present embodiment, the door is locked when a lock button on the door is pushed down by the lock motor.

As described above, upon detecting that the vehicle VH has stopped, the vehicle management apparatus 20 according to the present embodiment determines, based on vehicle data VD indicating a status of the vehicle VH, whether a driver 11 of the vehicle VH is making a delivery. The vehicle management apparatus 20 controls a door of the vehicle VH to lock in a case in which it has been determined that the driver 11 is making a delivery.

According to such a configuration, the door of the vehicle VH is locked in a case in which it has been determined that the driver 11 of the vehicle VH is making a delivery. In other words, the door of the vehicle VH is not locked in a case in which the driver 11 is not making a delivery, i.e., when the driver 11 is leaving the vehicle VH for purposes other than package delivery, e.g., for the purpose of loading and unloading packages at a warehouse of a logistics provider or for the purpose of taking a rest. Thus, the driver 11 need not unlock the door of the vehicle VH every time the driver 11 leaves the vehicle VH. Therefore, anti-theft technology is improved in convenience.

As a variation of the present embodiment, the controller 21 of the vehicle management apparatus 20 may control the door of the vehicle VH to lock in a case in which it has been determined in step S4 of FIG. 3 that a distance from the position P1 of the vehicle VH to the position P2 of the driver 11 is greater than or equal to a threshold TH. Specifically, the controller 21 may acquire first position data PD1 and second position data PD2. The first position data PD1 is data indicating the position P1 of the vehicle VH. The second position data PD2 is data indicating the position P2 of the driver 11. The controller 21 may then control the door of the vehicle VH to lock in a case in which it has been determined that the distance from the position P1 indicated by the acquired first position data PD1 to the position P2 indicated by the acquired second position data PD2 is greater than or equal to the threshold TH. Each position is indicated by, for example, two-dimensional coordinates or three-dimensional coordinates. Operations of the controller 21 of the vehicle management apparatus 20 according to this variation will be described with reference to FIG. 4.

Figure 4:
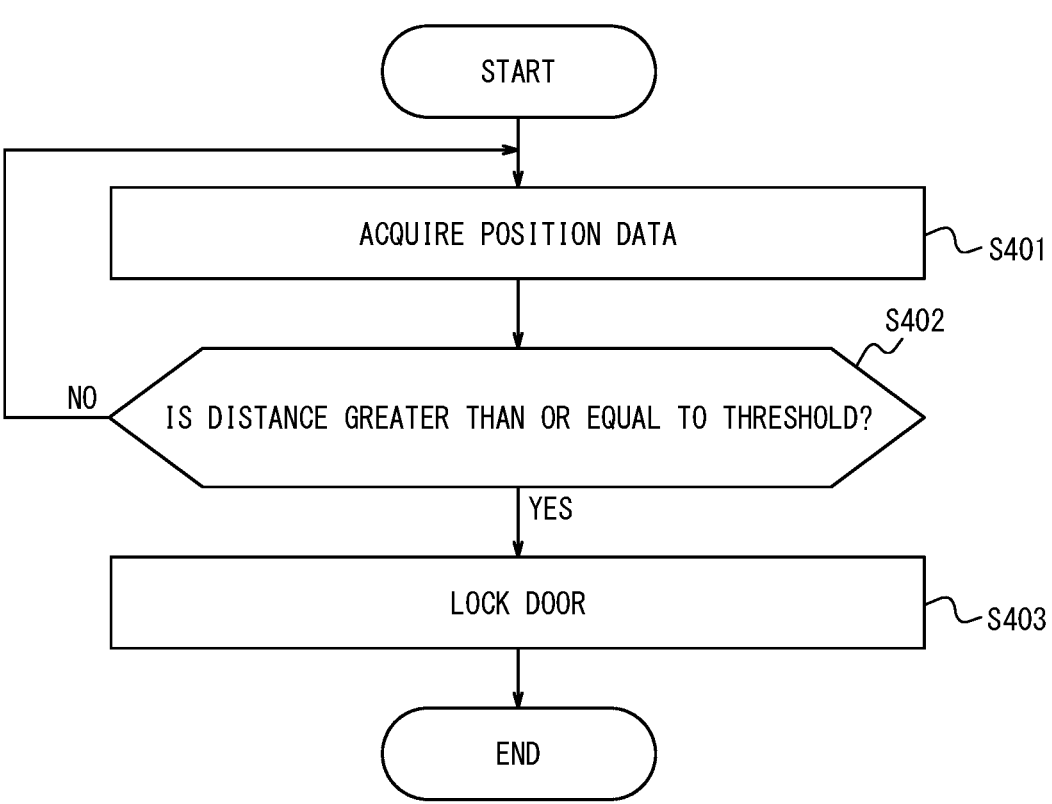
FIG. 4 is a flowchart illustrating operations of the vehicle management apparatus according to a variation of the embodiment of the present disclosure.

The flowchart in FIG. 4 describes in detail the process of step S4 in FIG. 3. In step S401 of FIG. 4, the controller 21 of the vehicle management apparatus 20 acquires first position data PD1 and second position data PD2.

In this variation, the first position data PD1 indicating the position P1 of the vehicle VH may be measured by any procedure. For example, the controller 21 of the vehicle management apparatus 20 acquires, as the first position data PD1, data indicating a position P1 measured by a positioner PS1 included in the vehicle VH. The position P1 may be measured using the positioner PS1 by any procedure, but the following procedure is adopted, for example. The positioner PS1 includes at least one GNSS receiver. The term "GNSS" is an abbreviation of global navigation satellite system. GNSS is, for example, GPS, QZSS, BDS, GLONASS, or Galileo. The term "GPS" is an abbreviation of Global Positioning System. The term "QZSS" is an abbreviation of Quasi-Zenith Satellite System. QZSS satellites are called quasi-zenith satellites. The term "BDS" is an abbreviation of BeiDou Navigation Satellite System. The term "GLO-NASS" is an abbreviation of Global Navigation Satellite System. The positioner PS1 measures the position P1 and transmits, to the vehicle management apparatus 20, position data indicating a measurement result. The controller 21 of the vehicle management apparatus 20 receives, via the communication interface 23, the position data transmitted from the positioner PS1, to acquire the received position data as the first position data PD1.

In this variation, the second position data PD2 indicating the position P2 of the driver 11 may be acquired by any procedure. For example, the controller 21 of the vehicle management apparatus 20 acquires, as the second position data PD2, data indicating a position P2 measured by a terminal apparatus TM held by the driver 11. The position P2 may be measured using the terminal apparatus TM by any procedure, but the following procedure is adopted, for example. The terminal apparatus TM measures the position P2 with a positioner PS2 included in the terminal apparatus TM. The positioner PS2 includes at least one GNSS receiver. GNSS is, for example, GPS, QZSS, BDS, GLONASS, or Galileo. QZSS satellites are called quasi-zenith satellites. The terminal apparatus TM transmits position data indicating the position P2 measured by the positioner PS2 to the vehicle management apparatus 20. The controller 21 of the vehicle management apparatus 20 receives the position data transmitted from the terminal apparatus TM via the communication interface 23, to acquire the received position data as the second position data PD2.

In step S402 of FIG. 4, the controller 21 of the vehicle management apparatus 20 determines whether a distance from the position P1 indicated by the first position data PD1 to the position P2 indicated by the second position data PD2, which are acquired in step S401, is greater than or equal to a threshold TH. The threshold TH, which may be any value, may be, for example, a distance at which it is considered possible for the driver 11 to pay attention to the vehicle VH, such as a distance small enough to allow the vehicle VH to be sufficiently visible from the driver 11. In a case in which it has been determined in step S402 that the distance from the position P1 indicated by the first position data PD1 to the position P2 indicated by the second position data PD2 is greater than or equal to the threshold TH, the process of step S403 is performed. In a case in which it has been determined in step S402 that the distance from the position P1 indicated by the first position data PD1 to the position P2 indicated by the second position data PD2 is less than the threshold TH, the process of step S401 is performed again.

In step S403 of FIG. 4, the controller 21 of the vehicle management apparatus 20 controls a door of the vehicle VH to lock. The process of step S403 is the same as the door locking process of step S4 of FIG. 3, and thus a description thereof is omitted.

According to this variation, in a case in which it has been determined that the driver 11 is making a delivery, the controller 21 of the vehicle management apparatus 20 acquires first position data PD1 indicating the position P1 of the vehicle VH and second position data PD2 indicating the position P2 of the driver 11. The first position data PD1 is data indicating the position P1 of the vehicle VH. The second position data PD2 is data indicating the position P2 of the driver 11. The controller 21 then controls a door of the vehicle VH to lock in a case in which it has been determined that a distance from the position P1 indicated by the acquired first position data PD1 to the position P2 indicated by the acquired second position data PD2 is greater than or equal to a threshold TH. In other words, according to this variation, the door of the vehicle VH is locked at a stage at which the driver 11 during making a delivery has moved far away from the vehicle VH to have difficulty in paying attention to the vehicle VH. Thus, security can be increased more efficiently and anti-theft technology is further improved in convenience.

As a further variation of this variation, the controller 21 of the vehicle management apparatus 20 may adjust the threshold TH according to a difference DF between the weight W1 indicated by the first weight data WD1 and the weight W2 indicated by the second weight data WD2. Here, the difference DF is considered to correspond to the weight of the package LG1 taken out for delivery by the driver 11. The controller 21 may decrease the threshold TH as the difference DF is larger. This is because the larger the difference DF, i.e., the greater the weight of the package LG, the more difficult it is likely to be for the driver 11 to pay attention to the vehicle VH. This is because the greater the weight of the package LG1, the more the driver 11 concentrates on delivery work, such as carrying the package LG1. Alternatively, this is because the greater the weight of the package LG1, the longer it takes to perform delivery work.

As another further variation of this variation, in a case in which it has been determined that the driver 11 is making a delivery, the controller 21 of the vehicle management apparatus 20 may further acquire value data ED indicating a value E of packages LG' remaining in the vehicle VH. The controller 21 may then adjust the threshold TH according to the value E indicated by the acquired value data ED. Specifically, the controller 21 may decrease the threshold TH when the value E indicated by the value data ED is higher. This is because the greater and more expensive the value E of the packages LG' remaining in the vehicle VH, the greater the damage in a case in which the packages LG' are stolen. The packages LG' remaining in the vehicle VH may be determined arbitrarily. For example, the controller 21 may determine, as the packages LG', one or more packages captured in an image acquired by an image sensor installed in the vehicle VH. In this example, the packages LG' include one or more packages LGi, . . . , LGn remaining in the cargo compartment LR or cabin of the vehicle VH. The value data ED may be acquired by any procedure, such as the following procedure. As an example, a procedure for acquiring value data EDi on a package LGi in the one or more packages LGi, . . . , LGn will be described. When the package LGi is brought by a sender to an agency of a delivery service provider, a clerk at the agency accepting the package LGi, for example, enters information indicating a value Ei of the package LGi declared by the sender, into an agency terminal apparatus installed at the agency, as part of a procedure for accepting the package LGi. The value Ei may be any value, e.g., a monetary value of the package LGi. The agency terminal apparatus transmits, to the vehicle management apparatus 20, the entered information indicating the value Ei, as value data EDi on the package LGi. The controller 21 of the vehicle management apparatus 20 receives and acquires, via the communication interface 23, the value data EDi transmitted from the agency terminal apparatus. In the same manner, the controller 21 acquires value data EDii, . . . , EDn on packages LGii, . . . , LGn, other than the package LGi, respectively. Then, the controller 21 acquires, as the value data ED, data indicating a result of adding up values Ei, . . . , En indicated by the acquired value data EDi, . . . , EDn, respectively. The controller 21 of the vehicle management apparatus 20 may separately acquire delivery completion data on packages LG including the package LG1 taken out for delivery by the driver 11, determine, based on the delivery completion data, packages LG' remaining in the vehicle VH, and obtain the value data ED in real time by adding up values of the determined respective packages LG'.

The present disclosure is not limited to the embodiment described above. For example, two or more blocks described in the block diagram may be integrated, or a block may be divided. Instead of executing two or more steps described in the flowcharts in chronological order in accordance with the description, the steps may be executed in parallel or in a different order according to the processing capability of the apparatus that executes each step, or as required. Other modifications can be made without departing from the spirit of the present disclosure.

For example, the controller 21 of the vehicle management apparatus 20 may further control an engine of the vehicle VH to stop in a case in which it has been determined that the driver 11 is making a delivery. Specifically, in a case in which it has been determined that the driver 11 is making a delivery in step S3 of FIG. 3, the controller 21 may determine whether the engine of the vehicle VH is running. In a case in which it has been determined that the engine is running, the controller 21 may control the engine of the vehicle VH to stop. The controller 21, for example, controls the engine to stop via an engine control circuit provided in the vehicle VH. Alternatively, in a case in which the engine is operated and controlled by power supplied from a power source installed in the vehicle VH, the controller 21 may control the engine to stop by shutting off the power supply to the engine. According to such a configuration, the engine of the vehicle VH is stopped while the driver 11 is making a delivery, which is effective from both security and energy conservation perspectives.

The vehicle management apparatus 20 may be installed in the vehicle VH.

Examples of some embodiments of the present disclosure are described below. However, it should be noted that the embodiments of the present disclosure are not limited to these examples.

[Appendix 1] A vehicle management apparatus configured to manage a vehicle for delivery loaded with one or more packages, the vehicle management apparatus comprising a controller configured to:
upon detecting that the vehicle has stopped, determine, based on vehicle data indicating a status of the vehicle, whether a driver of the vehicle is making a delivery; and
control a door of the vehicle to lock in a case in which it has been determined that the driver is making a delivery.

[Appendix 2] The vehicle management apparatus according to appendix 1, wherein the controller is configured to:
acquire, as the vehicle data, weight data including first weight data indicating a weight of the vehicle measured at a first time point before the vehicle has stopped and second weight data indicating a weight of the vehicle measured at a second time point after the vehicle has stopped; and determine that the driver is making a delivery in a case in which, as a result of comparison between the weight indicated by the first weight data and the weight indicated by the second weight data, the weight indicated by the second weight data is less than the weight indicated by the first weight data.

[Appendix 3] The vehicle management apparatus according to appendix 1 or 2, wherein the controller is configured to:

in a case in which it has been determined that the driver is making a delivery, acquire first position data indicating a position of the vehicle and second position data indicating a position of the driver; and control the door to lock in a case in which it has been determined that a distance from the position indicated by the first position data to the position indicated by the second position data is greater than or equal to a threshold.

[Appendix 4] The vehicle management apparatus according to any one of appendices 1 to 3, wherein the controller is configured to adjust the threshold according to a difference between the weight indicated by the first weight data and the weight indicated by the second weight data.

[Appendix 5] The vehicle management apparatus according to any one of appendices 1 to 4, wherein the controller is configured to:

in a case in which it has been determined that the driver is making a delivery, acquire value data indicating a value of a package remaining in the vehicle; and adjust the threshold according to the value indicated by the acquired value data.

[Appendix 6] The vehicle management apparatus according to any one of appendices 1 to 5, wherein the controller is configured to:

acquire, as the vehicle data, door data indicating an open/close status of the door of the vehicle;

determine, based on the acquired door data, whether the door has been opened and closed; and determine that the driver is making a delivery in a case in which it has been determined that the door had been opened and closed.

[Appendix 7] The vehicle management apparatus according to any one of appendices 1 to 6, wherein the controller is configured to:

upon determining that the driver is making a delivery, acquire first position data indicating a position of the vehicle and second position data indicating a position of the driver; and control the door to lock in a case in which it has been determined that a distance from the position indicated by the first position data to the position indicated by the second position data is greater than or equal to a threshold.

[Appendix 8] The vehicle management apparatus according to claim 1, wherein the controller is configured to, in a case in which it has been determined that the driver is making a delivery, further control an engine of the vehicle to stop.

[Appendix 9] A vehicle comprising the vehicle management apparatus according to any one of appendices 1 to 8.

[Appendix 10] A vehicle management method for managing a vehicle for delivery loaded with one or more packages, the vehicle management method comprising:

upon detecting that the vehicle has stopped, determining, by a controller based on vehicle data indicating a status of the vehicle, whether a driver of the vehicle is making a delivery; and controlling, by the controller, a door of the vehicle to lock in a case in which it has been determined that the driver is making a delivery.

[Appendix 11] The vehicle management method according to appendix 10, wherein the determining based on the vehicle data includes:

acquiring, by the controller as the vehicle data, first weight data indicating a weight of the vehicle measured at a first time point before the vehicle has stopped and second weight data indicating a weight of the vehicle measured at a second time point after the vehicle has stopped; and determining, by the controller, that the driver is making a delivery in a case in which, as a result of comparison between the weight indicated by the first weight data and the weight indicated by the second weight data, the weight indicated by the second weight data is less than the weight indicated by the first weight data.

[Appendix 12] The vehicle management method according to appendix 10 or 11, further comprising, in a case in which it has been determined that the driver is making a delivery, acquiring, by the controller, first position data indicating a position of the vehicle and second position data indicating a position of the driver, wherein the controlling of the door to lock includes controlling, by the controller, the door to lock in a case in which it has been determined that a distance from the position indicated by the first position data to the position indicated by the second position data is greater than or equal to a threshold.

[Appendix 13] The vehicle management method according to any one of appendices 10 to 12, further comprising adjusting, by the controller, the threshold according to a difference between the weight indicated by the first weight data and the weight indicated by the second weight data.

[Appendix 14] The vehicle management method according to any one of appendices 10 to 13, further comprising:

in a case in which it has been determined that the driver is making a delivery, acquiring, by the controller, value data indicating a value of a package remaining in the vehicle; and adjusting, by the controller, the threshold based on the value indicated by the acquired value data.

[Appendix 15] The vehicle management method according to any one of appendices 10 to 14, wherein the determining based on the vehicle data includes:

acquiring, by the controller as the vehicle data, door data indicating an open/close status of the door of the vehicle;

determining, by the controller based on the acquired door data, whether the door has been opened and closed; and determining, by the controller, that the driver is making a delivery in a case in which it has been determined that the door had been opened and closed.

[Appendix 16] The vehicle management method according to any one of appendices 10 to 15, further comprising, in a case in which it has been determined that the driver is making a delivery, acquiring, by the controller, first position data indicating a position of the vehicle and second position data indicating a position of the driver, wherein the controlling of the door to lock includes controlling, by the controller, the door to lock in a case in which it has been determined that a distance from the position indicated by the first position data to the position indicated by the second position data is greater than or equal to a threshold.

[Appendix 17] The vehicle management method according to appendices 10 to 16, further comprising, in a case in which it has been determined that the driver is making a delivery, controlling, by the controller, an engine of the vehicle to stop.

[Appendix 18] A non-transitory computer readable medium storing a program configured to cause a computer, as a vehicle management apparatus configured to manage a vehicle for delivery loaded with one or more packages, to execute operations, the operations comprising:

upon detecting that the vehicle has stopped, determining, based on vehicle data indicating a status of the vehicle, whether a driver of the vehicle is making a delivery; and controlling a door of the vehicle to lock in a case in which it has been determined that the driver is making a delivery.

[Appendix 19] The non-transitory computer readable medium according to appendix 18, wherein the determining based on the vehicle data includes:

acquiring, as the vehicle data, weight data including first weight data indicating a weight of the vehicle measured at a first time point before the vehicle has stopped and second weight data indicating a weight of the vehicle measured at a second time point after the vehicle has stopped; and determining that the driver is making a delivery in a case in which, as a result of comparison between the weight indicated by the first weight data and the weight indicated by the second weight data, the weight indicated by the second weight data is less than the weight indicated by the first weight data.

[Appendix 20] The non-transitory computer readable medium according to appendix 18 or 19, wherein the determining based on the vehicle data includes:

acquiring, as the vehicle data, door data indicating an open/close status of the door of the vehicle;

determining, based on the acquired door data, whether the door has been opened and closed; and determining that the driver is making a delivery in a case in which it has been determined that the door had been opened and closed.

The invention claimed is:

1. A vehicle management apparatus configured to manage a vehicle for delivery loaded with one or more packages, the vehicle management apparatus comprising a controller configured to:

upon detecting that the vehicle has stopped, determine, based on vehicle data indicating a status of the vehicle, whether a driver of the vehicle is making a delivery; and control a door of the vehicle to lock in a case in which it has been determined that the driver is making a delivery, wherein the controller is configured to:

acquire, as the vehicle data, weight data including first weight data indicating a weight of the vehicle measured at a first time point before the vehicle has stopped and second weight data indicating a weight of the vehicle measured at a second time point after the vehicle has stopped;

determine that the driver is making a delivery in a case in which, as a result of comparison between the weight indicated by the first weight data and the weight indicated by the second weight data, the weight indicated by the second weight data is less than the weight indicated by the first weight data;

in a case in which it has been determined that the driver is making a delivery, acquire first position data indicating a position of the vehicle and second position data indicating a position of the driver; and control the door to lock in a case in which it has been determined that a distance from the position indicated by the first position data to the position indicated by the second position data is greater than or equal to a threshold; and adjust the threshold according to a difference between the weight indicated by the first weight data and the weight indicated by the second weight data.

2. The vehicle management apparatus according to claim 1, wherein the controller is configured to: in a case in which it has been determined that the driver is making a delivery, acquire value data indicating a value of a package remaining in the vehicle; and adjust the threshold according to the value indicated by the acquired value data.

3. The vehicle management apparatus according to claim 1, wherein the controller is configured to: acquire, as the vehicle data, door data indicating an open/close status of the door of the vehicle;

determine, based on the acquired door data, whether the door has been opened and closed; and determine that the driver is making a delivery in a case in which it has been determined that the door had been opened and closed.

4. The vehicle management apparatus according to claim 3, wherein the controller is configured to: in a case in which it has been determined that the driver is making a delivery, acquire first position data indicating a position of the vehicle and second position data indicating a position of the driver; and control the door to lock in a case in which it has been determined that a distance from the position indicated by the first position data to the position indicated by the second position data is greater than or equal to a threshold.

5. The vehicle management apparatus according to claim 1, wherein the controller is configured to, in a case in which it has been determined that the driver is making a delivery, further control an engine of the vehicle to stop.

6. A vehicle comprising the vehicle management apparatus according to claim 1.

7. A vehicle management method for managing a vehicle for delivery loaded with one or more packages, the vehicle management method comprising:

upon detecting that the vehicle has stopped, determining, by a controller based on vehicle data indicating a status of the vehicle, whether a driver of the vehicle is making a delivery; and controlling, by the controller, a door of the vehicle to lock in a case in which it has been determined that the driver is making a delivery, wherein the determining based on the vehicle data includes:

acquiring, by the controller as the vehicle data, weight data including first weight data indicating a weight of the vehicle measured at a first time point before the vehicle has stopped and second weight data indicating a weight of the vehicle measured at a second time point after the vehicle has stopped;

determining, by the controller, that the driver is making a delivery in a case in which, as a result of comparison between the weight indicated by the first weight data and the weight indicated by the second weight data, the weight indicated by the second weight data is less than the weight indicated by the first weight data;

in a case in which it has been determined that the driver is making a delivery, acquiring, by the controller, first position data indicating a position of the vehicle and second position data indicating a position of the driver, wherein the controlling of the door to lock includes controlling, by the controller, the door to lock in a case in which it has been determined that a distance from the position indicated by the first position data to the position indicated by the second position data is greater than or equal to a threshold; and adjusting, by the controller, the threshold according to a difference between the weight indicated by the first weight data and the weight indicated by the second weight data.

8. The vehicle management method according to claim 7, further comprising: in a case in which it has been determined that the driver is making a delivery, acquiring, by the controller, information indicating a value of a package remaining in the vehicle; and adjusting, by the controller, the threshold based on the acquired information.

9. The vehicle management method according to claim 7, wherein the determining based on the vehicle data includes: acquiring, by the controller as the vehicle data, door data indicating an open/close status of the door of the vehicle; determining, by the controller based on the acquired door data, whether the door has been opened and closed; and determining, by the controller, that the driver is making a delivery in a case in which it has been determined that the door had been opened and closed.

10. The vehicle management method according to claim 9, further comprising, in a case in which it has been determined that the driver is making a delivery, acquiring, by the controller, first position data indicating a position of the vehicle and second position data indicating a position of the driver, wherein the controlling of the door to lock includes controlling, by the controller, the door to lock in a case in which it has been determined that a distance from the position indicated by the first position data to the position indicated by the second position data is greater than or equal to a threshold.

11. The vehicle management method according to claim 7, further comprising, in a case in which it has been determined that the driver is making a delivery, controlling, by the controller, an engine of the vehicle to stop.

12. A non-transitory computer readable medium storing a program configured to cause a computer, as a vehicle management apparatus configured to manage a vehicle for delivery loaded with one or more packages, to execute operations, the operations comprising:

upon detecting that the vehicle has stopped, determining, based on vehicle data indicating a status of the vehicle, whether a driver of the vehicle is making a delivery; and controlling a door of the vehicle to lock in a case in which it has been determined that the driver is making a delivery, wherein the determining based on the vehicle data includes:

acquiring, as the vehicle data, weight data including first weight data indicating a weight of the vehicle measured at a first time point before the vehicle has stopped and second weight data indicating a weight of the vehicle measured at a second time point after the vehicle has stopped;

determining that the driver is making a delivery in a case in which, as a result of comparison between the weight indicated by the first weight data and the weight indicated by the second weight data, the weight indicated by the second weight data is less than the weight indicated by the first weight data;

in a case in which it has been determined that the driver is making a delivery, acquiring first position data indicating a position of the vehicle and second position data indicating a position of the driver, wherein the controlling of the door to lock includes controlling the door to lock in a case in which it has been determined that a distance from the position indicated by the first position data to the position indicated by the second position data is greater than or equal to a threshold; and adjusting the threshold according to a difference between the weight indicated by the first weight data and the weight indicated by the second weight data.

13. The non-transitory computer readable medium according to claim 12, wherein the determining based on the vehicle data includes: acquiring, as the vehicle data, door data indicating an open/close status of the door of the vehicle; determining, based on the acquired door data, whether the door has been opened and closed; and determining that the driver is making a delivery in a case in which it has been determined that the door had been opened and closed.

* * * * *